Figure 1:
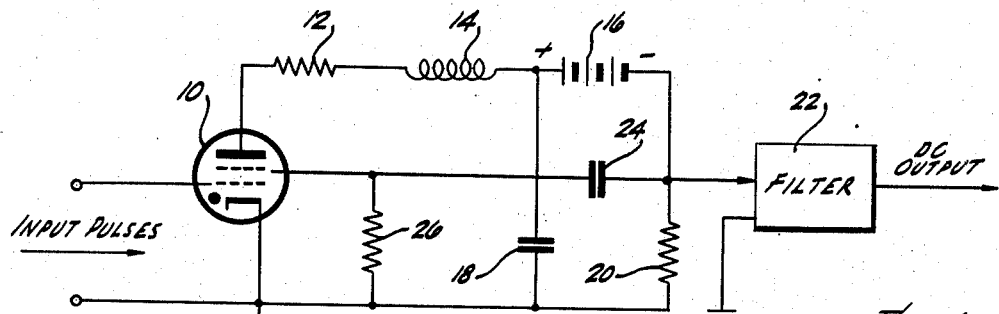
Figure 2:
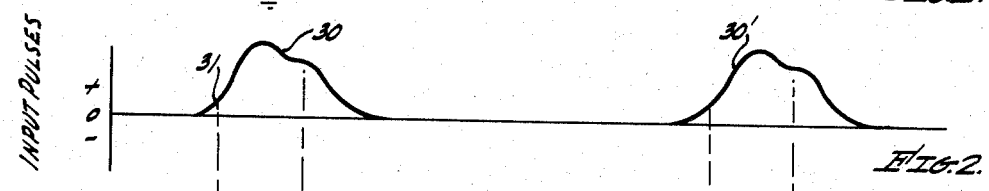
Figure 3:
Figure 4:
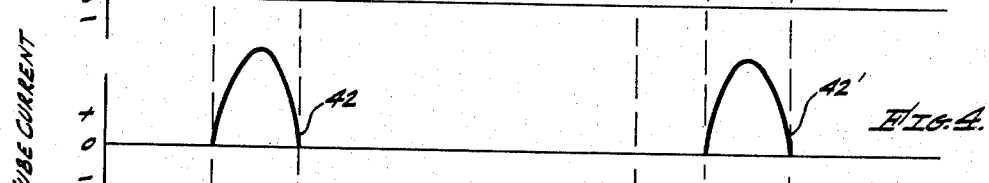

United States Patent Office 2,891,149
Patented June 16, 1959

2,891,149
PULSE RATE MEASURING CIRCUIT

Stephen C. Morrison, Beverly Hills, and Merritt T. Williams, Culver City, Calif., assignors to Hughes Aircraft Company, Culver City, Calif., a corporation of Delaware Application May 3, 1954, Serial No. 426,955

4 Claims. (Cl. 250—27)

This invention relates to pulse measuring techniques, and more particularly to an improved circuit means for continuously determining the repetition rate of pulses received from a source.

In certain applications, as in pulse counting techniques, it is desirable to know transient or continuously varying repetition rates of periodic pulses developed in a portion of a system. Circuits to accomplish this purpose are often undesirably elaborate and lacking in desired accuracy.

It is an object of this invention to provide an improved pulse measuring circuit arrangement to continuously measure the rate at which pulses from a source are developed.

It is another object of this invention to provide a pulse repetition rate measuring circuit of simpler design, greater accuracy, and higher output power than heretofore known.

It is still a further object of this invention to provide a circuit having a minimum number of components capable of highly accurate operation for converting the recurrence frequency of pulses developed by a pulse source to an analog form, such as a D.-C. voltage.

Yet another object of this invention is to provide a pulse repetition rate measuring circuit which is relatively insensitive to variations in input pulse width and input pulse shape, and whose output signal is accordingly a highly accurate function of input pulse rate despite such variations.

In a preferred embodiment of this invention, a thyratron tube is fired by an applied pulse, and a previously charged capacitor is discharged through the thyratron. The plate voltage of the tube is returned to its proper value and the capacitor is recharged during the interval between pulses. Circuit provision is made to prevent the tube from being fired prematurely before a succeeding pulse is applied. For applied pulses having less than a determined maximum repetition rate, the discharge of the capacitor during each pulse takes place from the same potential, and D.-C. voltages derived from the circuit accurately represent the pulse repetition rate.

The novel features which are believed to be characteristic of the invention, both as to its organization and method of operation, together with further objects and advantages thereof, will be better understood from the following description considered in connection with the accompanying drawings, in which an embodiment of the invention is illustrated by way of example. The scope of the invention is pointed out in the appended claims. In the drawing, Fig. 1 is a circuit diagram of a pulse repetition rate measuring circuit, in accordance with this invention; and Figs. 2–6 are waveforms to illustrate the operation and cooperation of the various parts of the circuit of Fig. 1.

Referring to the drawing, which is made a part of this specification, and more particularly to Fig. 1, an accurate and simple circuit to measure pulse repetition rate includes a thyratron tube 10, to the control grid of which input pulses of frequency $f$ are applied. The cathode of tube 10 is connected to ground, and its plate is connected through a serially connected resistor 12 and coil 14 to the positive terminal of a D.-C. supply source 16. A capacitor 18 is connected between the positive terminal of D.-C. source 16 and ground. Capacitor 18 is adapted to be charged from D.-C. source 16 to a predetermined level when tube 10 is nonconducting. An output circuit includes a resistor 20 connected between the negative terminal of D.-C. source 16 and ground. A filter circuit 22 is coupled to resistor 20 to develop D.-C. signals. The ungrounded end of resistor 20 is also coupled to the screen grid of tube 10, as through a capacitor 24, in which case a grounded bleeder resistor 26 is connected to such screen grid.

For the circuit above described to operated in the desired manner, the values of the various resistor-capacitor combinations are such that the time constant of resistor 12 and capacitor 18 is much smaller than that of resistor 20 and capacitor 18. Further, the time constant of resistor 20 and capacitor 18 is much greater than $$\frac{1}{f}$$

where $f$ is a predetermined maximum recurrence frequency for the input signal pulses. In addition, the time constant of resistor 26 and capacitor 24 is approximately that of resistor 20 and capacitor 18.

With the parameters established as indicated, the operation of the circuit will now be described with reference to Figs. 2–6 along with Fig. 1, as follows:

Tube 10 is adapted to fire only when an input pulse exceeds a predetermined amplitude. When an input pulse 30 (Fig. 2) is applied to tube 10, the plate potential (Fig. 3) is at a constant level, and a maximum charge is established across capacitor 18. When pulse 30 reaches the necessary amplitude indicated at point 31 of Fig. 2, the tube fires and capacitor 18 discharges through the tube. The plate voltage drops to a small minimum value, indicated at point 32 of Fig. 3, which is determined primarily by the tube characteristics.

During the interval in which capacitor 18 discharges, tube current (Fig. 4) rises to a maximum and then returns to zero. During conduction, plate voltage remains at the minimum value 32. However, the inductive effect of coil 14 tends to increase and then reduce the current to the point at which the tube will no longer support conduction, indicated at 42 in Fig. 4. At this point, the current drops sharply to zero as tube 10 is extinguished.

Because of the relative time constants, the discharge of capacitor 18 is sufficiently rapid so as not to be impeded by the tendency of D.-C. source 16 to recharge such capacitor.

Figure 5:
Figure 6:
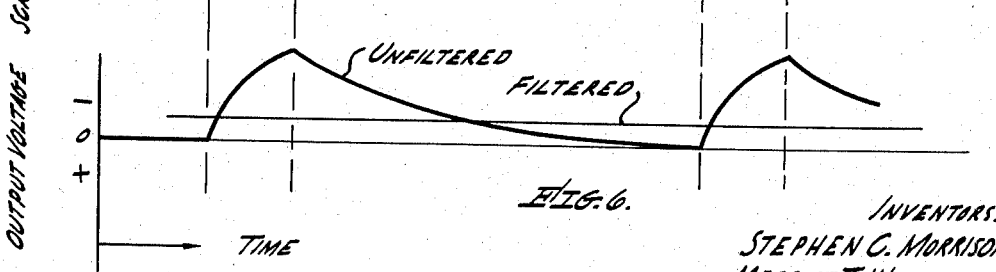

When tube 10 is fired, the negative output signal which appears across output resistor 20, due to the recharging effect of D.-C. source 16 is transmitted through the coupling of capacitor 24 to the screen grid. The coupling of capacitor 24 and bleeder resistor 26 effects an accompanying negative rise in screen voltage (Fig. 5). The negative voltage signal which appears on the screen grid assists in extinguishing the tube and in fact serves to maintain the tube in a cut-off condition after it is extinguished. The negative voltage also prevents premature firing of the tube on the same pulse or on succeeding pulses which occur at a rate higher than the maximum rate of operation desired for the circuit. After tube 10 is extinguished the negative screen voltage shown in Fig. 5 drops slowly along with the recharge of capacitor 18. The screen voltage is also reduced because the leakage path provided by bleeder resistor 26 prevents accumulation of charge due to screen current. Preferably, the values of capacitor 24 and bleeder resistor 26 are such that the screen voltage will not be returned to zero before capacitor 18 has recharged to its original charge, thereby assuring that capacitor 18 will always be discharged from the same potential. Such a response may be achieved by providing that the time constants of the circuits comprising capacitor 24 and resistor 26 and capacitor 18 and resistor 20 be substantially equal. Thus it can be seen that the effect of the screen grid, capacitor 24, and resistor 26 in the circuit of the present invention is to provide a desensitizing feedback circuit which makes it possible to utilize as input pulses for the circuit, broad, irregularly shaped pulses without introducing corresponding irregularities in the pulse rate repetition output signal of the circuit. Capacitor 24 also functions to block D.-C. screen current which might otherwise flow and tend to introduce error into the operation of the circuit.

Fluctuations in the signal level across output resistor 20 are smoothed by filter 22 to provide a D.-C. output voltage. The D.-C. output voltage has a magnitude which is proportional to the frequency of pulses of the signal applied to tube 10 and hence represents the repetition rate or recurrence frequency of the input pulses applied to tube 10.

Advantageous features of the circuit of this invention are that its response is unaffected by the shape of the input pulses, and only slightly affected by wide changes in all circuit parameters except supply voltage and capacitor 18. The circuit has an excellent linear response; for example, one practical embodiment of the circuit was found to have a linear response to within 0.3%.

From the foregoing, it is clear that there has been described an extremely simple but highly reliable pulse repetition rate measuring circuit for obtaining a D.-C. signal which accurately represents the transient rate at which pulses are applied to the circuit.

What is claimed is:

1. A pulse rate measuring circuit comprising a thyratron tube having an anode, a cathode, a control grid, and a screen grid, a direct current voltage supply source having positive and negative terminals, a resistive connection between said positive terminal and said anode, a capacitor connected between said positive terminal and a point of reference potential, a resistor connected between said negative terminal and said point of reference potential, the time constant of said capacitor and said resistor being substantially greater than the time constant of said capacitor and the resistive connection between said direct current supply source and said anode, an input circuit coupled to said control grid and adapted to receive signal pulses to fire said tube upon the occurrence of said pulses, circuit means comprising a capacitor for connecting the junction of said resistor and said direct current source to said screen grid for applying a negative signal to said screen grid for preventing the refiring of said tube on the same input signal pulse and on succeeding input signal pulses exceeding a predetermined maximum recurrence frequency, and a filter connected to said resistor to develop a direct current signal representative of voltage fluctuations which appear across said resistor when said tube is fired.

2. The pulse rate measuring circuit defined in claim 1, wherein the time constant of said capacitor and said resistor is substantially shorter than $$\frac{1}{f}$$

where $f$ is said predetermined maximum recurrence frequency of said input signal pulses.

3. In combination, an electron discharge device having an anode, a cathode, a control grid, and a screen grid, a direct-current voltage source having positive and negative terminals, a resistive connection between said positive terminal and said anode, a capacitor connected between said positive terminal and a point of reference potential, a resistor connected between said negative terminal and said point, said cathode being connected to said point, the combination of said resistor and said capacitor having a time constant substantially longer than the combination of said capacitor and said resistive connection, a desensitizing feedback capacitive connection between said screen grid and said negative terminal, a bleeder resistor connected between said screen grid and said point, the time constant of said capacitive connection and said bleeder resistor being approximately the same as the time constant of said resistor and said capacitor, and direct-current voltage deriving means coupled to said resistor.

4. A pulse rate measuring circuit for producing an output signal proportional to the time rate of received input pulses, said circuit comprising: an electron discharge device having an anode, a cathode, a control grid and a screen grid, means for applying signal pulses whose rate of repetition is to be measured to said control grid, an output circuit interconnecting said anode and said cathode, said output circuit including a source of direct-current potential and including an output resistor across which a negative output signal appears in response to the application of input pulses to said electron discharge device, said output circuit including means for prolonging said negative output signal for a predetermined interval and means including a capacitor for applying at least a portion of said negative output signal to the screen grid of said electron discharge device for inhibiting the further response of said circuit to applied input pulses.

References Cited in the file of this patent
UNITED STATES PATENTS

| | | |
|---|---|---|
| 2,164,968 | Urtel et al. | July 4, 1939 |
| 2,172,746 | Young | Sept. 12, 1939 |
| 2,218,067 | Faudell et al. | Oct. 15, 1940 |
| 2,284,378 | Dome | May 26, 1942 |
| 2,301,220 | Lowe | Nov. 10, 1942 |
| 2,521,710 | Gallay | Sept. 12, 1950 |
| 2,563,256 | Lord et al. | Aug. 7, 1951 |
| 2,617,027 | Douma | Nov. 4, 1952 |

UNITED STATES PATENT OFFICE

CERTIFICATE OF CORRECTION

Patent No. 2,891,149                                 June 16, 1959

Stephen C. Morrison et al.

It is hereby certified that error appears in the printed specification of the above numbered patent requiring correction and that the said Letters Patent should read as corrected below.

Column 1, line 52, for "determined" read -- predetermined --; column 2, line 16, for "operated" read -- operate --.

Signed and sealed this 27th day of October 1959.

(SEAL)
Attest:

KARL H. AXLINE
Attesting Officer

ROBERT C. WATSON
Commissioner of Patents